(12) United States Patent
Sorensen

(10) Patent No.: US 8,818,467 B2
(45) Date of Patent: Aug. 26, 2014

(54) HEADSET SYSTEM WITH A HEADSET UNIT AND A DETACHABLE WEARING DEVICE

(71) Applicant: Michael Sorensen, Jyllinge (DK)

(72) Inventor: Michael Sorensen, Jyllinge (DK)

(73) Assignee: GN Netcom A/S (DK)

( * ) Notice: Subject to any disclaimer, the term of this patent is extended or adjusted under 35 U.S.C. 154(b) by 0 days.

(21) Appl. No.: 13/922,832

(22) Filed: Jun. 20, 2013

(65) Prior Publication Data

US 2013/0344924 A1    Dec. 26, 2013

(30) Foreign Application Priority Data

Jun. 21, 2012   (EP) .................................... 12172896

(51) Int. Cl.
*H04M 1/00* (2006.01)
*H04M 1/05* (2006.01)

(52) U.S. Cl.
CPC ...................... *H04M 1/05* (2013.01); *H04M 2250/12* (2013.01)
USPC ................... 455/575.2; 455/90.1; 455/550.1; 379/430; 381/376

(58) Field of Classification Search
CPC . H04M 1/05; H04M 2250/12; H04M 1/0245; H04M 1/6058
USPC ............ 455/90.3, 575.1, 575.2, 575.6, 575.7, 455/550.1; 379/430, 447; 381/330, 376, 381/381
See application file for complete search history.

(56) References Cited

U.S. PATENT DOCUMENTS

| | | | |
|---|---|---|---|
| 5,381,486 A * | 1/1995 | Ludeke et al. | 381/375 |
| 2007/0003098 A1 | 1/2007 | Martenson et al. | |
| 2008/0220831 A1 | 9/2008 | Alameh et al. | |
| 2010/0103776 A1 * | 4/2010 | Chan | 367/119 |
| 2013/0182867 A1 * | 7/2013 | Knowles | 381/74 |

OTHER PUBLICATIONS

European Search Report for European patent application No. 12172896 dated Dec. 17, 2012.

* cited by examiner

*Primary Examiner* — Nhan Le
(74) *Attorney, Agent, or Firm* — Altera Law Group, LLC

(57) ABSTRACT

A headset system (10) comprising a headset unit (1) and a detachable wearing device (4). The headset unit (1) comprises a microphone arm (3), which is movable between a compact position and an extended position. A proximity sensor (29; 33) in the headset unit (1) detects whether the microphone arm (3) is in the compact position or the extended position. The headset unit (1) and the wearing device (4) are adapted to be movably attached to each other, so that the headset unit (1) can be moved between a use position and a rest position. The proximity sensor (29; 33) detects, when the headset unit (1) is moved into the rest position.

15 Claims, 7 Drawing Sheets

HEADSET SYSTEM WITH A HEADSET UNIT AND A DETACHABLE WEARING DEVICE

TECHNICAL FIELD

The invention relates to headset system comprising a headset unit and a detachable wearing device, the headset unit comprises
  a housing,
  a microphone arm, which is movably attached to the housing, whereby it is movable between a compact position and an extended position, wherein one of the housing and the microphone arm comprises a proximity sensor, and the other of the housing and the microphone arm comprises a first sensor target, which is sensed by the proximity sensor when the microphone arm is in the compact position,
the detachable wearing device comprises
  attachment means for attaching the wearing device to the head of a user.

BACKGROUND ART

A headset system according to the preamble is known as Jabra Supreme. Jabra Supreme is a Bluetooth headset with a foldable microphone arm. When not in use, the microphone arm can be folded against the housing into a compact position, whereby it is easier to carry in a pocket, for example. When in use, the microphone arm is moved in to an extended position, whereby the microphone is located relative close to the mouth of the user. A magnetic sensor in the microphone arm and a magnet in the headset housing are used to sense whether the microphone arm is in the compact position or extended position. Jabra Supreme comprises an ear hook, by means of which it can be attached to the ear of the user. The ear hook can be exchanged with a differently shaped ear hook and thereby be fitted to the individual.

DISCLOSURE OF INVENTION

The specification provides a headset according to the preamble, wherein
  the headset unit and the wearing device are adapted to be movably attached to each other, so that the headset unit can be moved between a use position and a rest position, wherein, the wearing device comprises a second sensor target, which is sensed by the proximity sensor of the headset unit, when the headset unit is moved into the rest position.

With such a system, the same proximity sensor can be utilized in two conditions. In a first condition, wherein the wearing device is not attached to the headset unit, the headset unit can be switched between different modes by moving the microphone arm between the compact position and the extended position. In the compact position, the proximity sensor detects the first sensor target. In the extended position, the proximity sensor does not detect the first sensor target. In a second condition, where the wearing device is attached to the headset unit, the same proximity sensor can be utilized for switching the headset between different modes by moving the headset unit between the use position and the rest position. In the use position, the proximity sensor does not detect the second sensor target is not sensed by the proximity sensor. In the rest position, the proximity sensor detects the second senor target.

The proximity sensor may be comprised by the microphone arm.

According to an embodiment, the proximity sensor is a magnetic sensor, such as a Hall sensor, and the first and second sensor targets may in this case comprise magnets.

According to an embodiment, a proximate end of the microphone arm is attached to the housing by means of a hinge, whereby it is foldable between the compact position and the extended position.

According to an embodiment, the housing comprises a first housing side with a speaker opening, wherein the microphone arm is folded against the first housing side in the compact position.

The headset unit may detachable attached at the first housing side to the wearing device.

According to a preferred embodiment, the housing is rotatably attached to the wearing device, so that the headset unit can be rotated between the use position and the rest position.

According to an embodiment, the wearing device is a headband device and the attachment means a headband.

According to an embodiment, the microphone arm is oriented essential parallel with the headband in the rest position. Thus, if the user wears the headband in a normal way, it is located essentially parallel with the so-called "coronal plane" of the human body, whereby the microphone arm, when in the rest position, is oriented essentially parallel with the coronal plane and points in the same direction as the top of the user's head.

According to another embodiment, the wearing device is a neckband device and the attachment means is a neckband.

Preferably, the headset unit comprises a second detachable wearing device.

This second detachable wearing device may be an ear hook.

According to an embodiment, the headset unit comprises a speaker, a microphone and a battery. Alternatively, the headset unit may be corded, whereby it does not require a battery.

According to an embodiment, the headset unit is powered off in the rest position.

According to another embodiment, the microphone is muted, when the headset unit is in the rest position.

The headset unit may comprise a wearing device sensor for sensing whether the wearing device is attached to the headset unit or not.

This sensing may be utilized to change audio properties, such as loudness or frequency characteristics, because the acoustic coupling between the speaker opening of the headset unit and the user's ear may depend on whether the headset unit is used with for example an ear hook or a headband/neckband.

The sensing may also be utilised for changing the functionality of the proximity switch. Thus, when the headset is used with the wearing device, whether it is a headband or neckband, the proximity switch may mute the microphone in the rest position, while the proximity switch powers the headset unit off, when the headset is not used with the wearing device.

BRIEF DESCRIPTION OF THE DRAWINGS

The invention is explained in detail below with reference to the drawing illustrating a preferred embodiment of the invention and in which.

MODES FOR CARRYING OUT THE INVENTION

Figure 1:
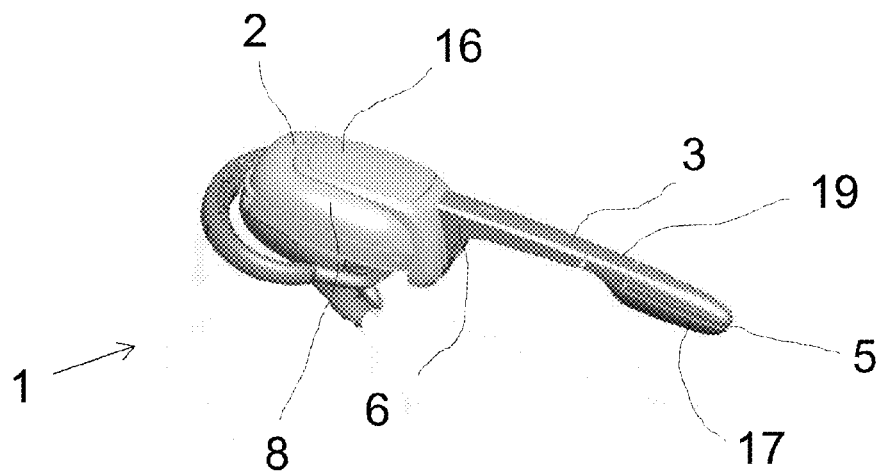
FIG. 1 is a perspective view of a headset unit to be used in a headset system according to the invention seen from a first direction.
Figure 2:
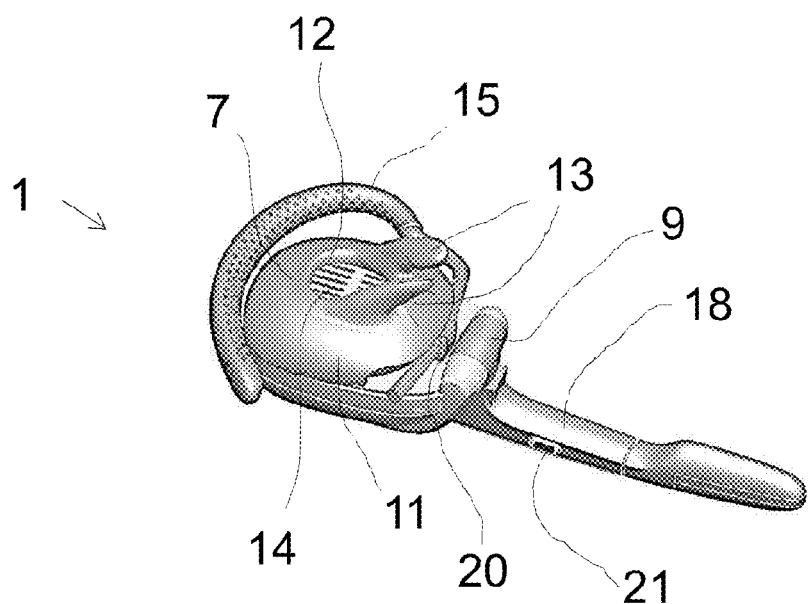
FIG. 2 is a perspective view of the headset unit seen from a second direction.

FIGS. 1 and 2 disclose a headset unit 1 to be used with a headset system according to the invention. The headset unit 1 can be used as a stand-alone Bluetooth headset and be wirelessly connected to for example a smart phone. The headset unit 1 comprises a housing 2, a microphone arm 3, which at a proximate end 6 is rotatably attached to the housing 2 by a hinge 9. The housing 2 comprises a first housing side 7 and an opposite located second housing side 8. The first housing side 7 is adapted to face the user's ear during use and comprises a speaker opening 14. On the first housing side 7 is arranged an ear bud 11 comprising two ear bud protrusions 13 to be inserted in the concha of the ear and an ear bud opening 12 aligned with the speaker opening 14. The microphone arm 3 comprises a first arm side 18, an opposite located second arm side 19 and a microphone slot 17 at the free end part 5 of the microphone arm 3. The microphone slot 17 is filled with foam and provides audio access to a microphone in the microphone arm 3. An ear hook 15 is detachably attached to the housing 2 by means of an ear hook coupling part 20. Thus, the headset unit 1 can be attached to the user's ear by mounting the ear hook 15 around the ear, whereby the speaker opening 14 is aligned with the ear canal. A relatively large multi-function button 16 is located on the second housing side 8, and a relatively small auxiliary button 21 is arranged on the microphone arm 3. FIGS. 1 and 2 disclose the headset unit 1 in an extended position where it is powered on and ready to use.

Figure 3:
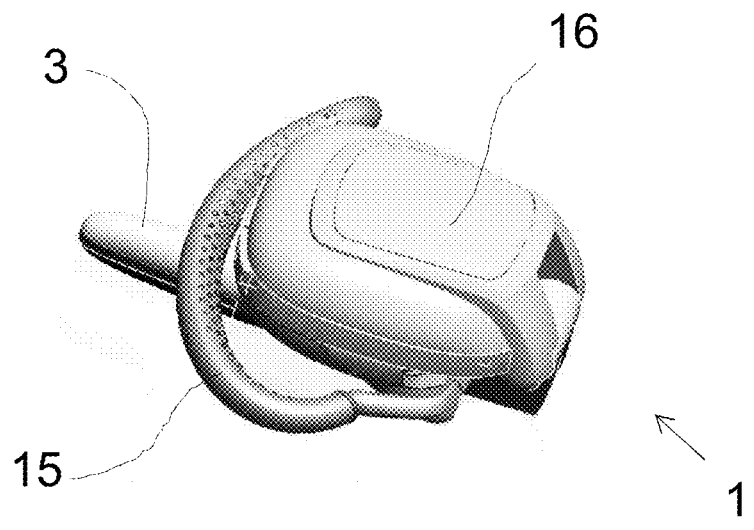
FIG. 3 is a perspective view of the headset unit with the microphone boom in a folded position, seen from the first direction.
Figure 4:
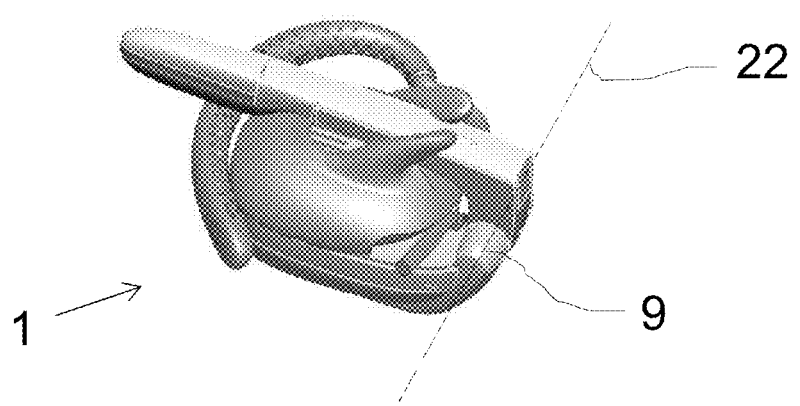
FIG. 4 is a perspective view of the headset unit with the microphone boom in a folded position, seen from the second direction.

FIGS. 3 and 4 disclose the headset unit 1 of FIGS. 1 and 2 in a compact position, where the microphone arm 3 is rotated approximately 180 degrees about the hinge axis 22, whereby the first arm side 18 faces the first housing side 7. In this position, the headset unit 1 is powered off and easy to carry, for example in a pocket.

Figure 5:
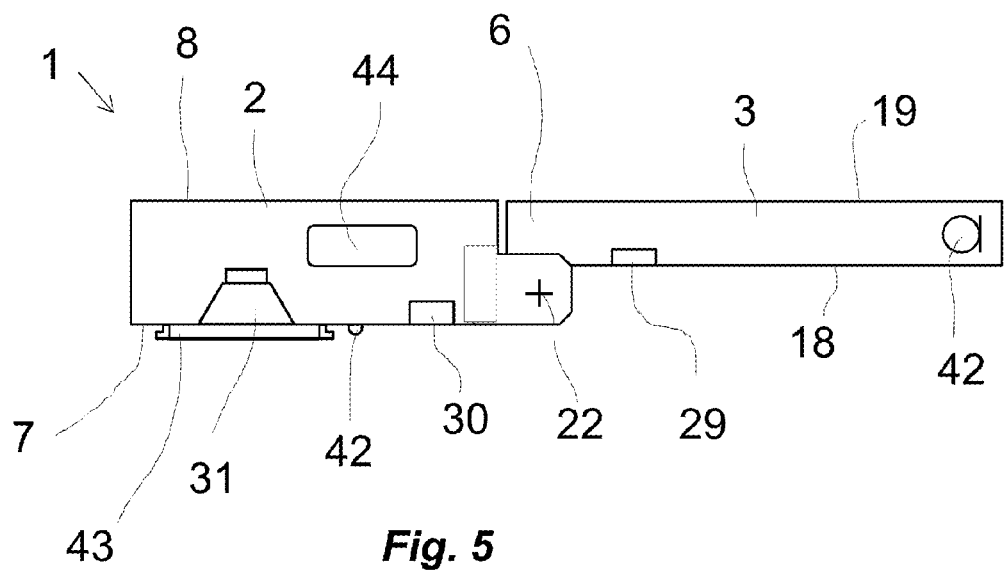
FIG. 5 is a diagram disclosing the headset unit in an extended position with some basic components disclosed in order to explain the invention.
Figure 6:
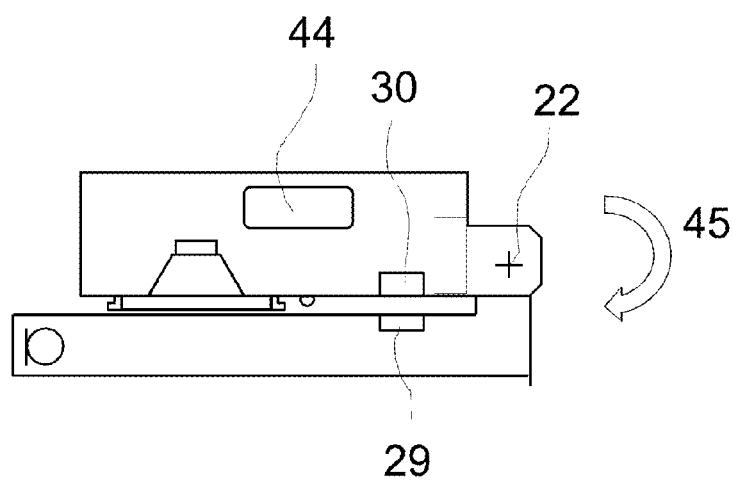
FIG. 6 is a diagram disclosing the headset unit in a compact position with some basic components disclosed in order to explain the invention.

FIG. 5 is a diagram disclosing the headset unit 1 in the extended position with some basic components disclosed in order to explain the invention. The housing 2 comprises a rechargeable battery 44 and a speaker 31 and the microphone arm 3 comprises a microphone 42. The ear hook 15 and ear hook coupling part 20 are not shown for clarity reasons. A magnetic sensor 29 is arranged in the microphone arm 3 and a housing magnet 30 is arranged in the housing 2. When the microphone arm 3 is rotated as indicated with arrow 45 about the hinge axis 22 from the extended position shown in FIG. 5 to the compact position shown in FIG. 6, the magnet sensor 29 and the housing magnet 30 are brought in proximity of each other, whereby the magnet sensor 29 senses the housing magnet 30 and powers the headset down to save battery. The first housing side 7 comprises a coupling part 43, which extends around the speaker opening (not shown). When the headset unit 1 is used with the ear hook 15, the coupling part 43 is used to attach the ear bud 11 (see FIGS. 1-4). When the headset unit 1 is to be used with in a headset system 10 according to the invention, the ear bud 11 is removed, and the coupling part 43 is used to attach the headset unit 1 to a wearing device, which will be described in the following. The first housing side 7 also comprises a wearing device sensor 42, which detects whether a wearing device is attached or not. This will also be described in the following.

Figure 7:
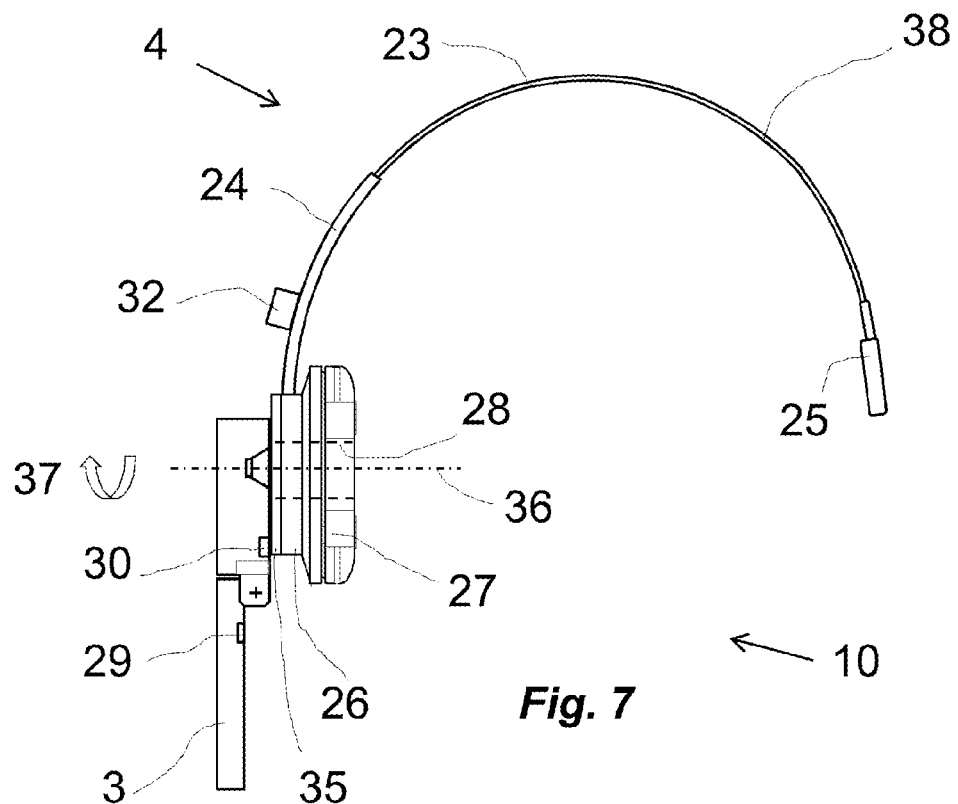
FIG. 7 is a front view of a headset system according to a first embodiment of the invention in a use position.
Figure 8:
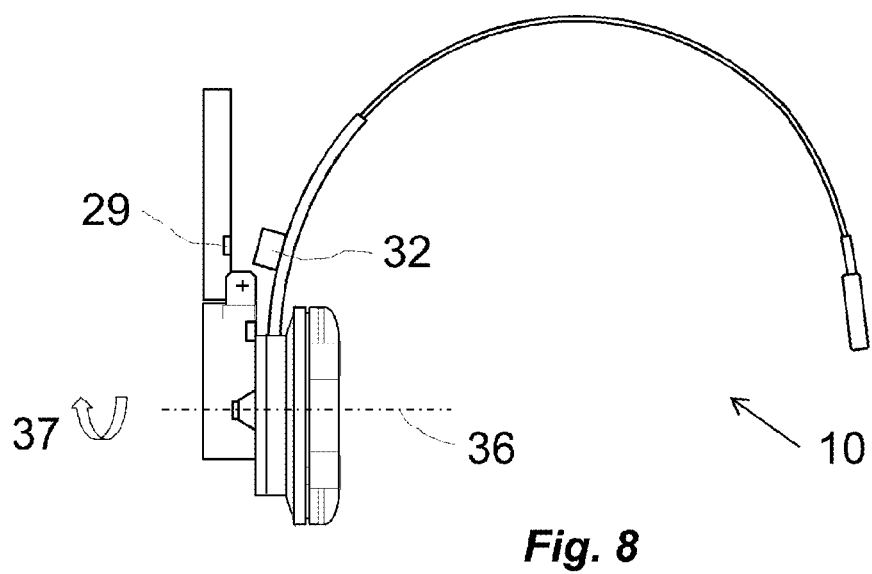
FIG. 8 is a front view of the headset system according to the first embodiment of the invention in a rest position.

FIG. 7 is a front view of a headset system 10 according to a first embodiment of the invention in a use position. The headset system 10 comprises a headset unit 1 as shown in FIGS. 1-6 and a headband unit 4. The headband unit 4 comprises a headband 38, a headset coupling part 26 and an ear cushion 27. The headband 38 consists of a first headband part 23, a second headband part 24 and end piece 25. The first headband part 23 is at one end attached to the end piece 25 and at the other end slidably received in the second headset part 2, so that the headband unit 4 can be adapted to the size of the user's head. The second headband part 24 is attached to the headset coupling part 26. An audio opening 28 extend through the headset coupling part 26 and the ear cushion 27. A headband magnet 32 is attached to the second headband part 24. The headset unit 1 is by means of the coupling part 43 attached the headset coupling part 26, whereby the speaker opening 14 of the headset unit 1 is aligned with the audio opening 28 through the headset coupling part 26 and the ear cushion 27. When the headset unit 1 and the headset coupling part 26 are attached to each other, the wearing device sensor 42 is activated, whereby the electronics of the headset unit 1 "knows", that the headset unit 1 is attached to the wearing device 4. Thus, the audio properties may be amended to better match the acoustic coupling provided by the headset coupling part 26 and ear cushion 27 between the speaker opening 14 and the ear of a user. A shown in FIG. 7, the headset unit 1 is in the extended position, and it is not possible to fold the microphone arm into the compact position due to the headset coupling part 26 and the ear cushion 27. However, the headset coupling part 26 comprises a rotatable part 35, which the headset unit 1 is attached to. Thereby the headset unit 1 can be rotated about an axis 36 through the speaker 21 and the audio opening 28 as indicated with the arrow 37 to the rest position shown in FIG. 8, where the magnet sensor 29 of the microphone arm 3 is adjacent the headband magnet 32. In this position the magnet sensor 29 senses the headband magnet 32 and switches the headset unit 1 off. In FIG. 7, the microphone arm 3 points downward, but in use the user should rotate it to the position, where the microphone is as close as possible to the mouth. This position does typically form an angle of 45-70 degrees with upright. Thus, there is no risk of accidentally switching the headset of during a telephone conversation. Furthermore, there is provided a mechanical resistance in the coupling device 26, so that the user can feel when the headset unit 1 enters the rest position, which is "along the second headband part 24"±20 degrees.

Figure 9:
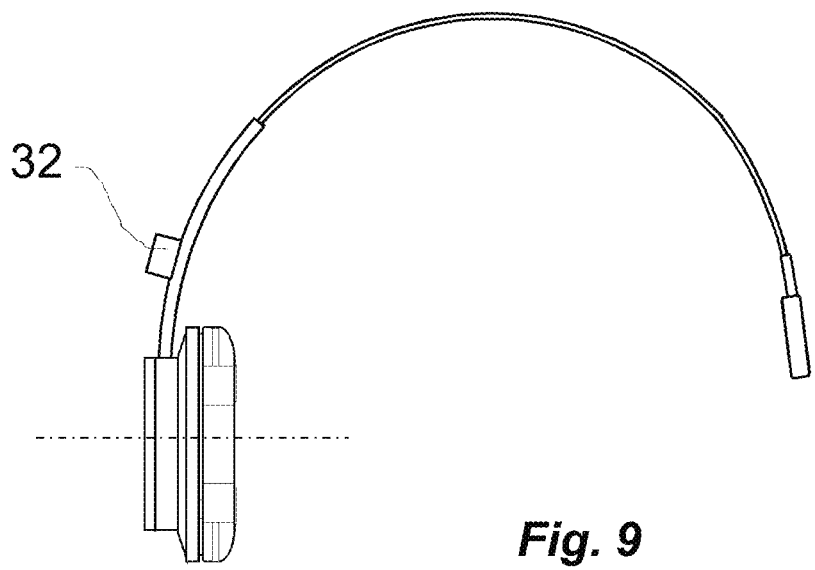
FIG. 9 is a front view of a headband device of the headset system according to the first embodiment.

FIG. 9 is a front view of a headband device 4 of the headset system 10 according to the first embodiment.

Figure 10:
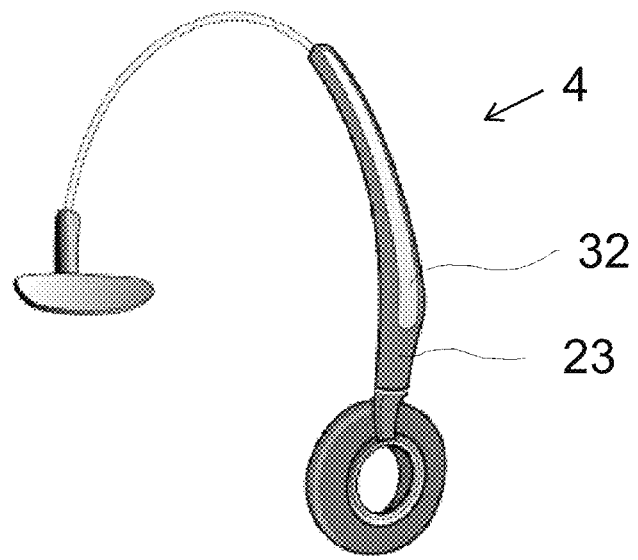
FIG. 10 is a perspective view of a headband to be used with a headset system according to a second embodiment of the invention.

FIG. 10 is a perspective view of a headband device 4 to be used with a headset system according to a second embodiment of the invention. This headband device 4 differs from the headband device 4 shown in FIG. 9 by a magnet 32 being an integrated design part of the headband device 4.

Figure 11:
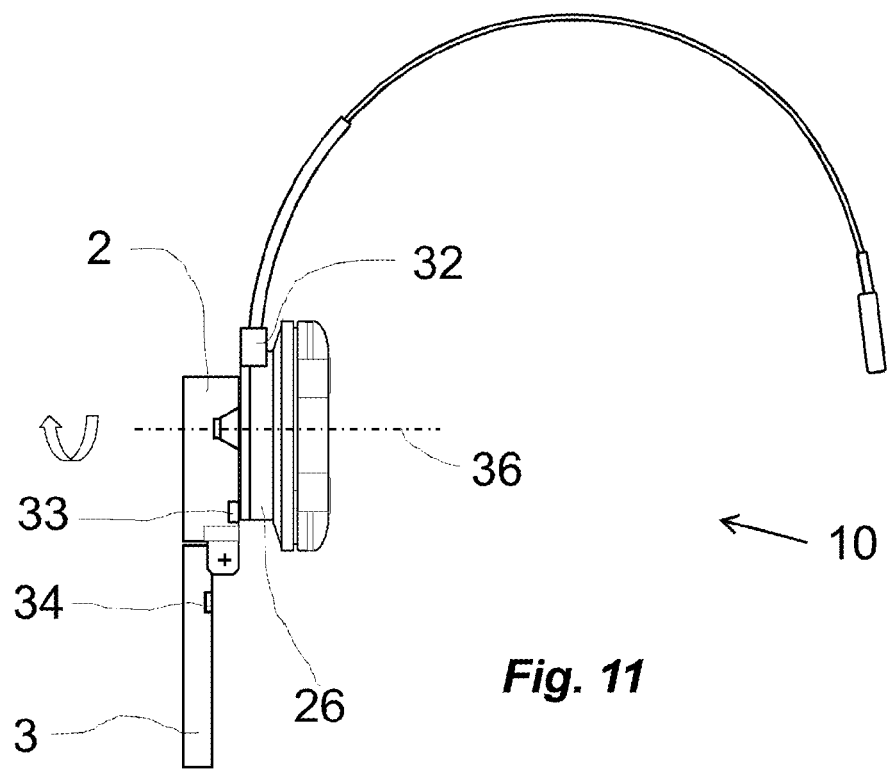
FIG. 11 is a front view of a headset system according to a third embodiment of the invention in a use position.
Figure 12:
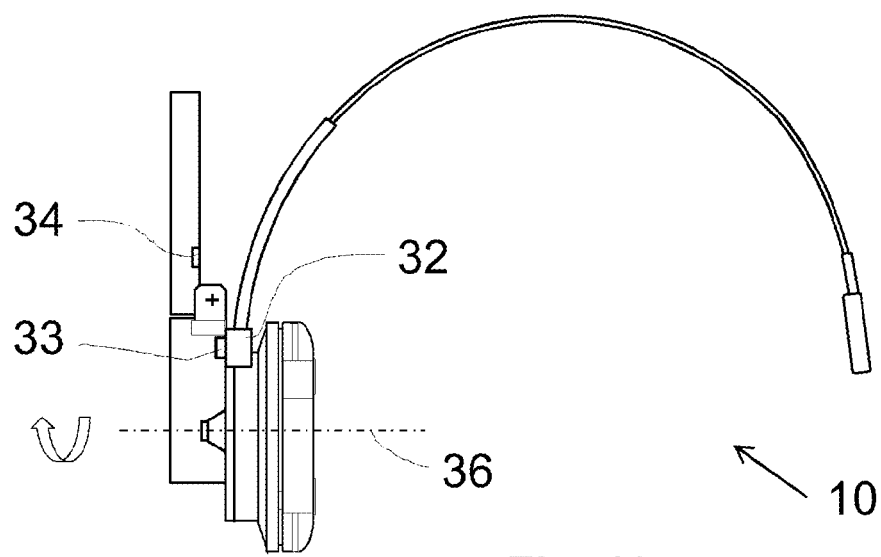
FIG. 12 is a front view of the headset system according to the third embodiment of the invention in a rest position.

FIGS. 11 and 12 are front views of a headset system 10 according to a third embodiment of the invention. This embodiment differs from the first embodiment by the headset unit 1 being provided with a magnet sensor 33 in the housing 2 and a microphone arm magnet 34 in the microphone arm 3. Thus, the headband magnet 32 is located adjacent the headset coupling part 26. In the use position shown in FIG. 11, the magnet sensor 33 does not detect any magnet in its proximity, whereby the headset unit 1 is powered on. When the headset unit 1 is rotated about the axis 36 to the rest position shown in FIG. 12, the magnet sensor 33 in the housing 2 detects the headband magnet 32, whereby the headset is powered off.

Figure 13:
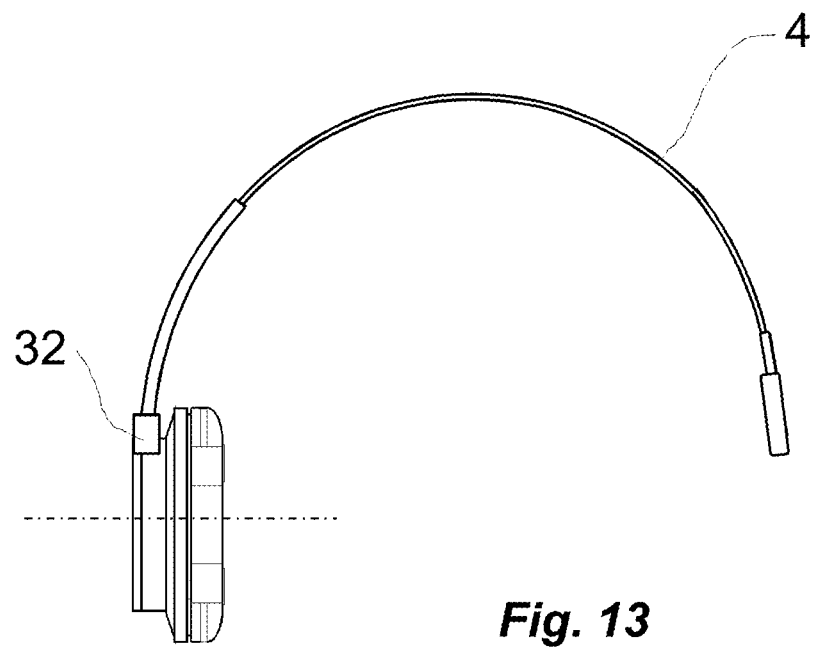
FIG. 13 is a front view of a headband device of the headset system according to the third embodiment.

FIG. 13 is a front view of a headband device 4 of the headset system according to the third embodiment.

Figure 14:
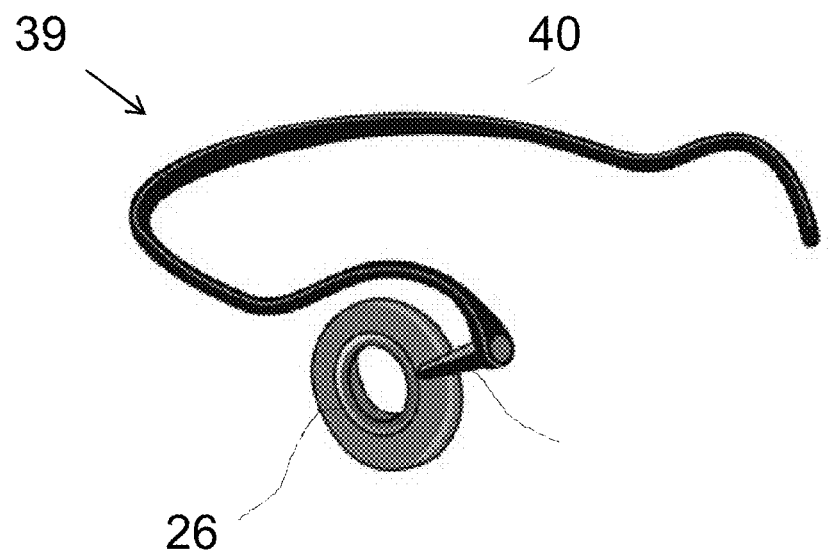
FIG. 14 is a perspective view of a neckband to be used with a headset system according to a fourth embodiment of the invention.

FIG. 14 is a perspective view of a neckband device 39 to be used with a headset system according to a fourth embodiment of the invention. This headband device 39 replaces the headband devices 4 according the previous shown embodiments. The neckband device 39 comprises a headset coupling part 26, a neckband 40 and a magnetic post 41, which connects the headband 20 to the headset coupling part 26. As the magnetic post 41 is magnetic, it has the same function as the headband magnet 32 according to the previous embodiments.

The invention is not limited to the above disclosed embodiments.

In an alternative embodiment, the microphone of the headset unit is not powered off, when it is attached to the wearing device and moved into the rest position. Instead, the microphone is muted, when the headset unit is in the rest position.

The wearing device sensor 42 shown in FIG. 5 may be used to change the function of the proximity switch, such that microphone is muted in the rest position, and the headset unit is powered off, when the microphone arm is in the compact position.

The proximity sensor does not have to be a magnet sensor. Also and inductive sensor and metallic sensor targets could be utilized.

| | Reference signs |
|---|---|
| 1 | headset unit |
| 2 | housing |
| 3 | microphone arm |
| 4 | headband device |
| 5 | free end part of microphone arm |
| 6 | proximate end of microphone arm |
| 7 | first housing side |
| 8 | second housing side |
| 9 | hinge |
| 10 | headset system |
| 11 | ear bud |
| 12 | ear bud opening |
| 13 | ear bud protrusion |
| 14 | speaker opening |
| 15 | ear hook |
| 16 | multi-function button |
| 17 | microphone slot |
| 18 | first arm side |
| 19 | second arm side |
| 20 | ear hook coupling part |
| 21 | mute button |
| 22 | hinge axis |
| 23 | first headband part |
| 24 | second headband part |
| 25 | end piece |
| 26 | headset coupling part |
| 27 | ear cushion |
| 28 | audio opening |
| 29 | magnet sensor in microphone arm |
| 30 | housing magnet |
| 31 | speaker |
| 32 | headband magnet |
| 33 | magnet sensor in housing |
| 34 | microphone arm magnet |
| 35 | rotatable part of headset coupling part |
| 36 | pivot axis |
| 37 | arrow |
| 38 | headband |
| 39 | neckband device |
| 40 | neckband |
| 41 | magnetic post |
| 42 | wearing device sensor |
| 43 | wearing device coupling part |
| 44 | battery |
| 45 | arrow |

The invention claimed is:

1. A headset system comprising a headset unit and a detachable wearing device, the headset unit comprises
a housing,
a microphone arm, which is movably attached to the housing, whereby it is movable between a compact position and an extended position, wherein one of the housing and the microphone arm comprises a proximity sensor, and the other of the housing and the microphone arm comprises a first sensor target, which is sensed by the proximity sensor when the microphone arm is in the compact position,
the detachable wearing device comprises
attachment means for attaching the wearing device to the head of a user; and wherein the headset unit and the wearing device are adapted to be movably attached to each other, so that the headset unit can be moved between a use position and a rest position,
wherein, the wearing device comprises a second sensor target, which is sensed by the proximity sensor of the headset unit, when the headset unit is into the rest position.

2. The headset system according to claim 1, wherein the proximity sensor is comprised by the microphone arm.

3. The headset system according to claim 1, wherein the proximity sensor is a magnetic sensor, such as a Hall sensor, and the first and second sensor targets comprise magnets.

4. The headset system according to claim 1, wherein the microphone arm at a proximate end is attached to the housing by means of a hinge, whereby it is foldable between the compact position and the extended position.

5. The headset system according to claim 4, wherein the housing comprises a first housing side with a speaker opening, and wherein the microphone arm is folded against the first housing side in the compact position.

6. The headset system according to claim 5, wherein the headset unit is detachable attached at the first housing side to the wearing device.

7. The headset system according to claim 1, wherein the housing is rotatably attached to the wearing device, so that the headset unit can be rotated between the use position and the rest position.

8. The headset system according to claim 1, wherein the wearing device is a headband device and the attachment means is a headband.

9. The headset system according to claim 8, wherein the microphone arm is oriented essentially parallel with the headband in the rest position.

10. The headset system according to claim 1, wherein the wearing device is a neckband device and the wearing device is a neckband.

11. The headset system according to claim 1, wherein the headset unit comprises a second detachable wearing device.

12. The headset system according to claim 11, wherein the second detachable wearing device is an ear hook.

13. The headset system according to claim 1, wherein the headset unit comprises a speaker, a microphone and a battery.

14. The headset system according to claim 13, wherein the headset unit is powered off in the rest position.

15. The headset system according to claim 13, wherein the microphone is muted, when the headset unit-is in the rest position.

* * * * *